Oct. 30, 1956 R. A. BOYD 2,768,556
CONTROL OF DAYLIGHTING
Filed May 14, 1951 6 Sheets-Sheet 1
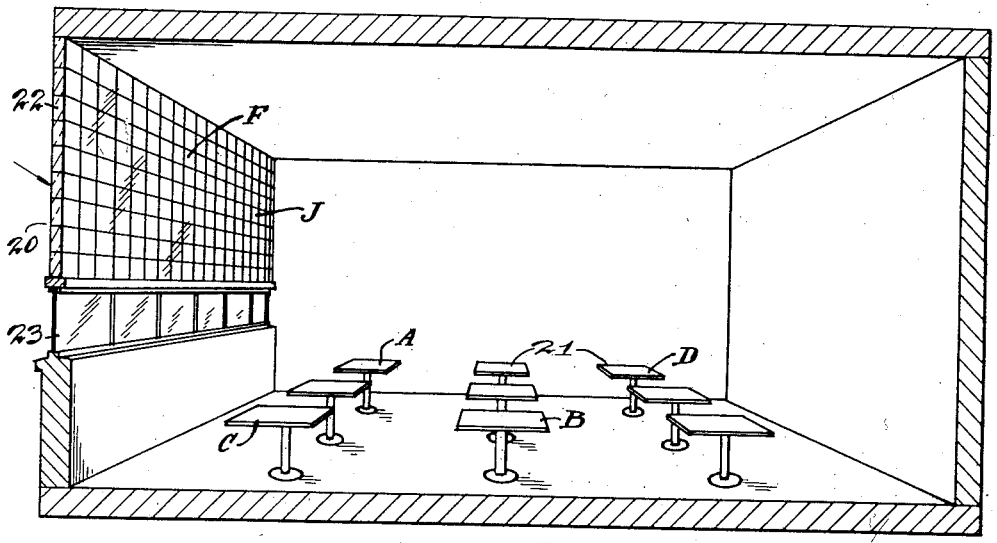
FIG-1-
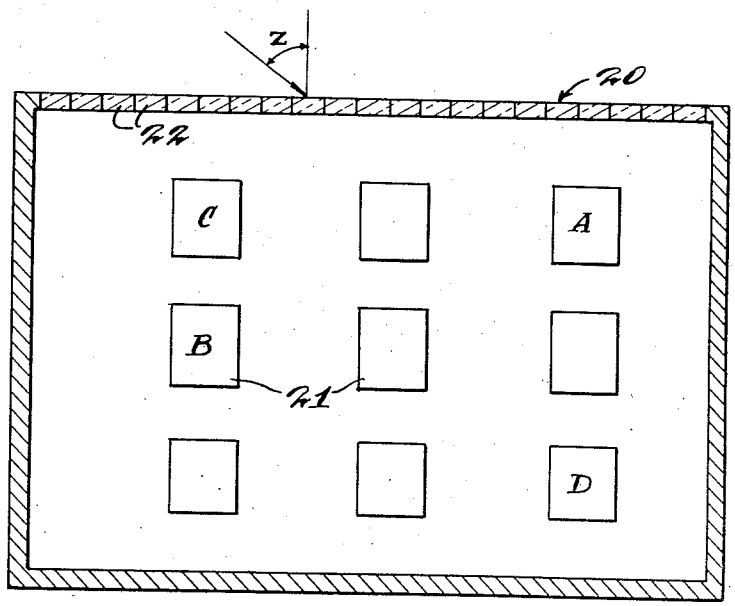
FIG-2-
INVENTOR:
ROBERT A. BOYD.
BY
ATTORNEYS.

Oct. 30, 1956  R. A. BOYD  2,768,556
CONTROL OF DAYLIGHTING
Filed May 14, 1951  6 Sheets-Sheet 2
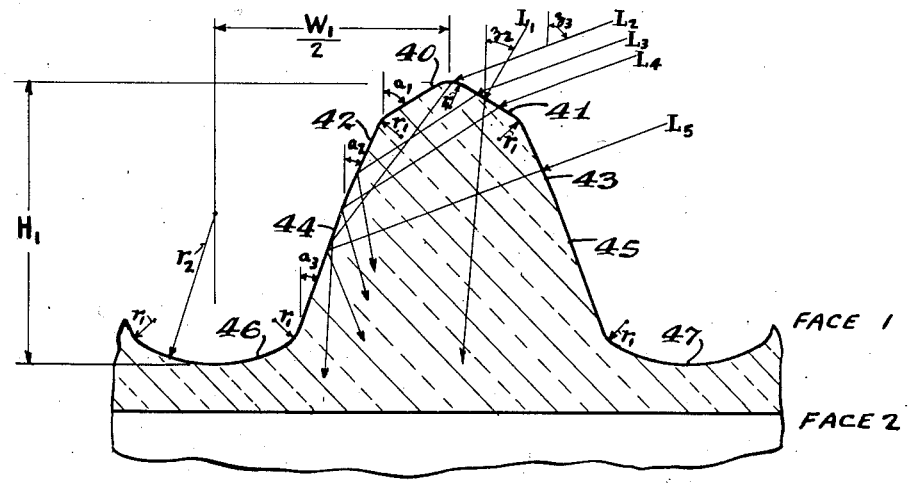
FIG-3-
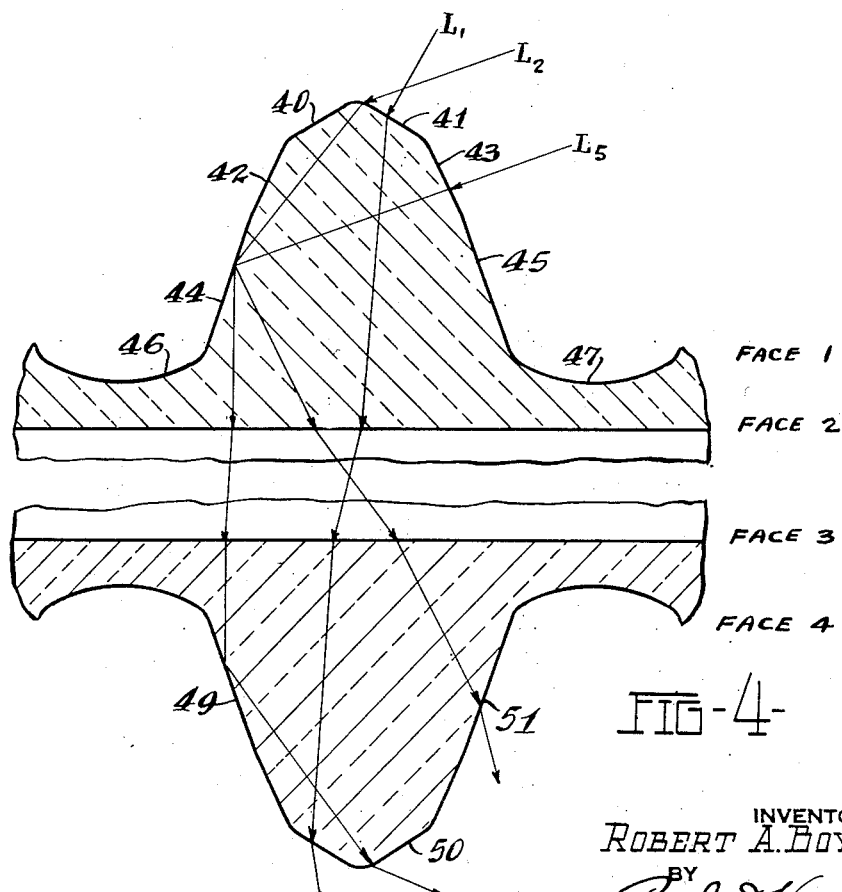
FIG-4-
INVENTOR:
ROBERT A. BOYD.
BY
Rule & Hope
ATTORNEYS.

Oct. 30, 1956   R. A. BOYD   2,768,556
CONTROL OF DAYLIGHTING
Filed May 14, 1951   6 Sheets-Sheet 3
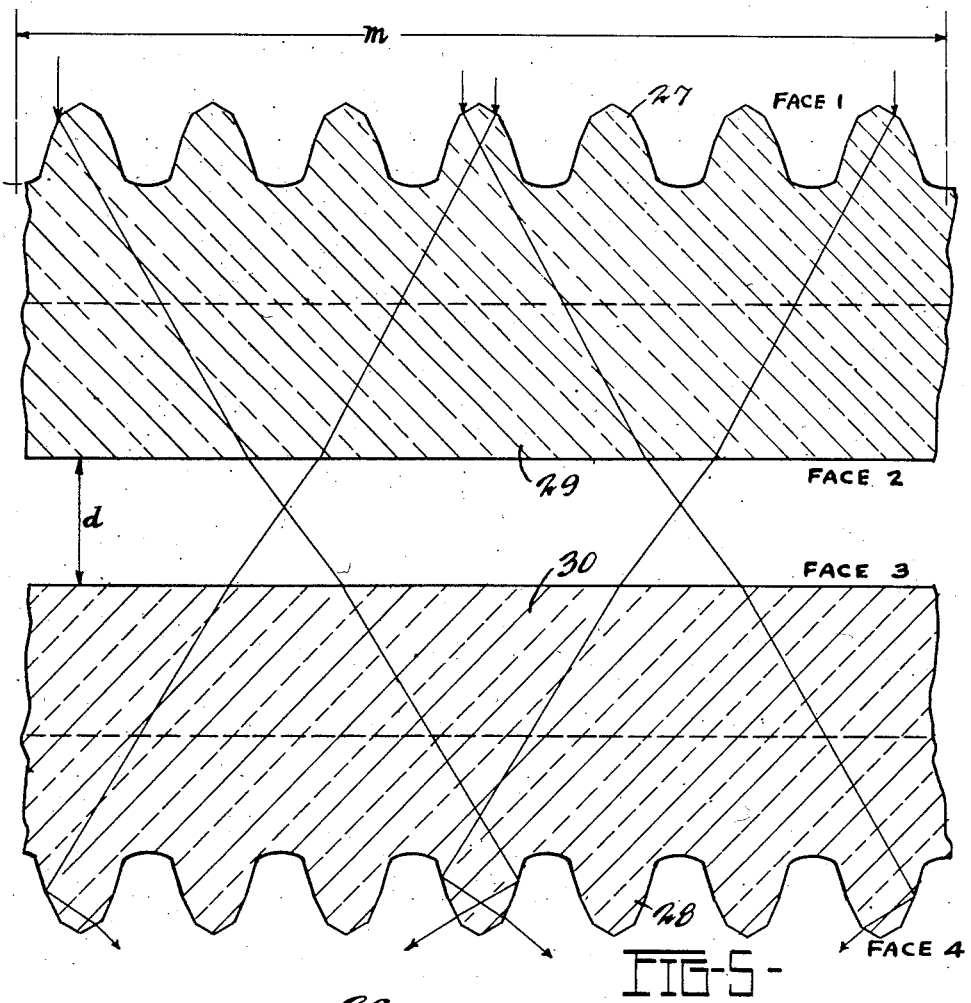
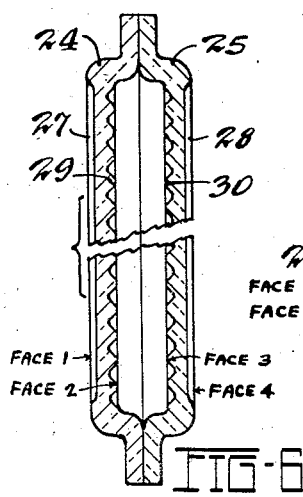 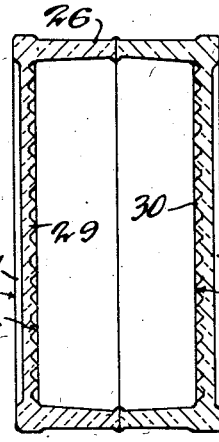 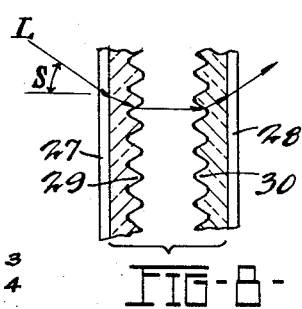
INVENTOR:
ROBERT A. BOYD.
BY
ATTORNEYS.

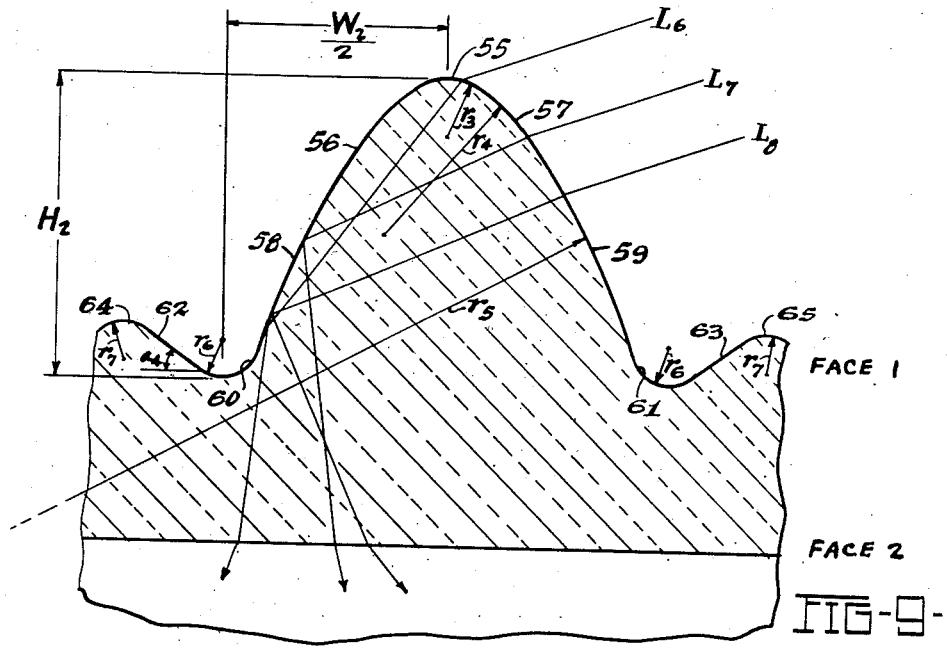
FIG-9-
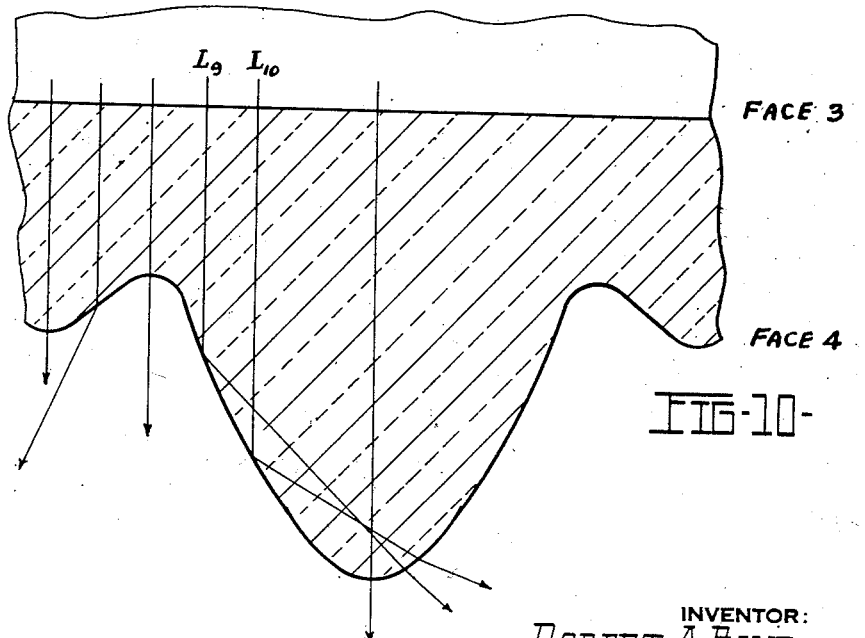
FIG-10-

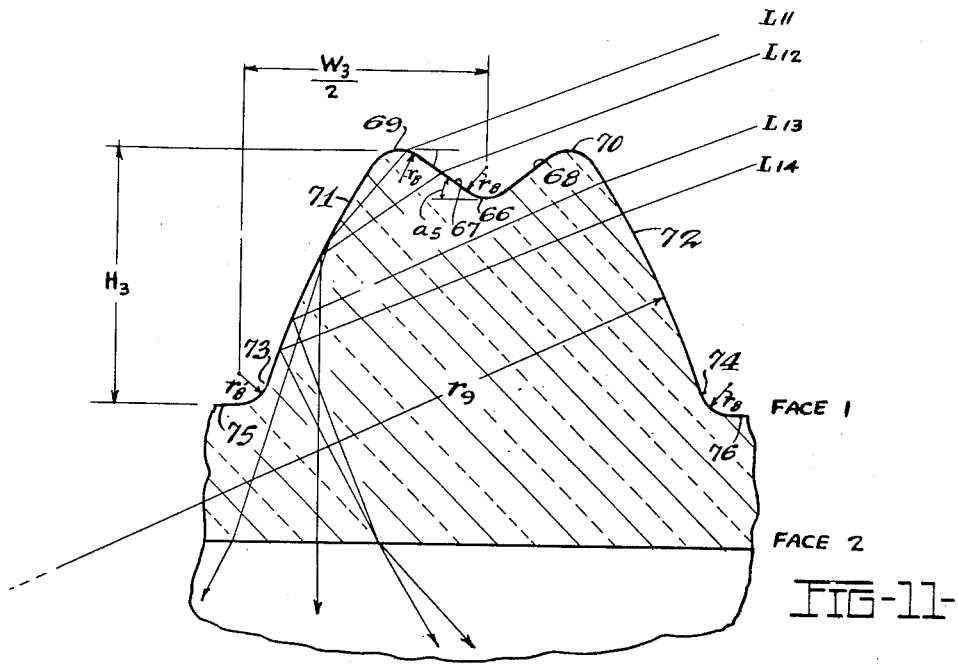

Oct. 30, 1956   R. A. BOYD   2,768,556
CONTROL OF DAYLIGHTING
Filed May 14, 1951   6 Sheets-Sheet 6
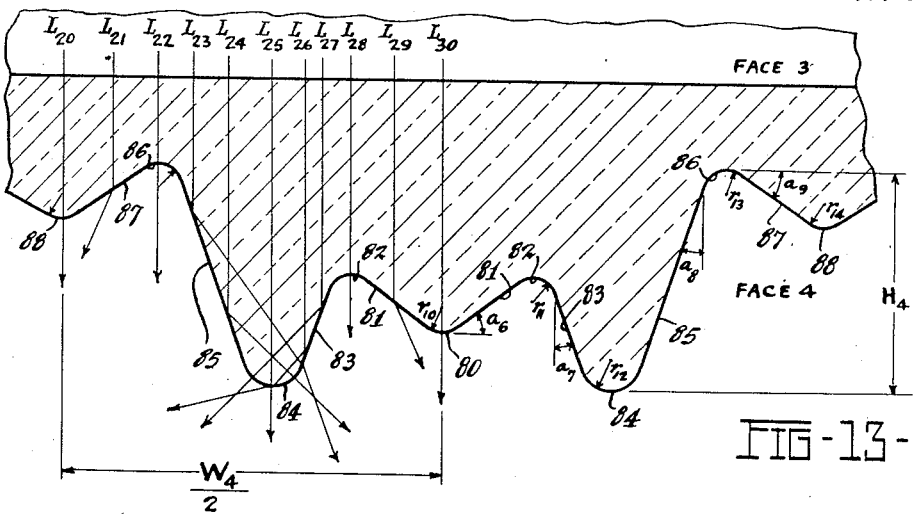
FIG-13-
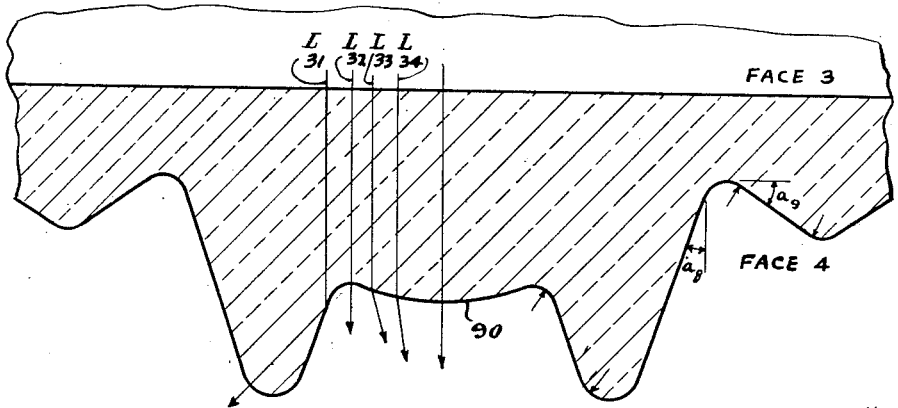
FIG-14-
INVENTOR:
ROBERT A. BOYD.
BY
ATTORNEYS.

United States Patent Office 2,768,556
Patented Oct. 30, 1956

2,768,556
CONTROL OF DAYLIGHTING

Robert A. Boyd, Ann Arbor, Mich., assignor to Owens-Illinois Glass Company, a corporation of Ohio Application May 14, 1951, Serial No. 226,153

11 Claims. (Cl. 88—60)

This invention relates to the utilization of daylight for lighting the interior of buildings and particularly to the construction of fenestration for lighting a room, such as a school room, where a high quality of light is required.

In illuminating interiors it has been customary, up to recently, to consider only the level or amount of illumination. More recently, those skilled in the art have found that the quality of the lighting is also of great importance. Several requirements are now considered important for high quality lighting. First, the level of the illumination must be sufficiently high and not vary appreciably or to any great extent with various task locations in the room or with exterior illumination changes such as are encountered with the changing sun positions throughout the day or the seasons of the year. Second, the ratio of the brightness of the fenestration to the brightness of the task (hereafter referred to as the brightness ratio) should be low. This is considered important in order that there are no great brightness contrasts in the room. Furthermore, the brightness ratio should not vary appreciably with different task locations and with exterior illumination changes throughout the day or the seasons of the year. Third, the brightness of the fenestration as viewed directly should be such that the average observer may view it without squinting or eye strain. In addition, the brightness should not vary greatly from various observer positions and from one portion of the fenestration to the other. These requirements should be fulfilled by any fenestration in order to produce a high quality of light in a room.

None of the prior art fenestrations, so far as I am aware, fulfills these requirements. For example, when clear flat glass is used as a fenestration material, the level of the illumination in a room is not uniform and the brightness ratio is high. Both the level of the illumination and the brightness ratio vary considerably with various task locations or with exterior illumination changes. Furthermore, it is well known that the brightness of clear flat glass fenestration is intolerable especially when the sun is shining directly through the fenestration.

More recently, glass blocks having horizontal prisms have been used as fenestration. These blocks aid in increasing the level of illumination by directing rays of light upwardly toward the ceiling. However, in these blocks, no provision is made for providing and maintaining low brightness ratios or for reducing and controlling the brightness of the fenestration as viewed directly. Such glass block particularly does not make any provision for so controlling the illumination or brightness that there are no appreciable changes with various task locations or with exterior illumination changes.

It is an object of this invention to utilize daylight to maintain a sufficiently high level of illumination throughout the interior of a room.

Another object of the invention is to maintain a uniform level of illumination which will not vary appreciably with various task locations or with exterior illumination changes.

Another object is to control the brightness ratio between the fenestration and the task and maintain it at a desired low level.

Another object is to control the brightness ratio so that it will not vary appreciably with various task locations.

A further object is to control the brightness ratio so that it will not vary appreciably or largely with exterior illumination changes.

A further object of the invention is to control the brightness of fenestration so that it is tolerable when viewed directly, and does not vary appreciably for various task locations or for various portions of the fenestration.

Other objects of the invention will appear hereinafter.

Basically, my invention comprises controlling the daylight by using four air-glass interfaces such as are present in a hollow glass block or in two spaced sheets of glass. In such a structure the interfaces are conventionally termed Faces 1, 2, 3, and 4—Face 1 being the exterior interface, Faces 2 and 3 being the inside interfaces, and Face 4 being the interface nearest the interior of the room.

According to my invention, Faces 1 and 4 are provided with vertical ribs having particular configurations and Faces 2 and 3 are provided with horizontal prisms.

The configuration of the ribs on Face 1 is such that light from wide azimuth angles is refracted and internally reflected and then transmitted to Face 2 at zero or small azimuth angles. This construction of the ribs on Face 1 provides a greater transmission of light and a more uniform illumination of Faces 2 and 3. In addition, this construction which is capable of utilizing light from wide azimuth angles aids in maintaining desired lighting conditions with exterior illumination changes throughout the day or the seasons of the year.

The horizontal prisms on Face 2 receive light from above the horizontal and direct the light in a generally horizontal direction. By the combined effect of Faces 1 and 2, the greater percentage of the light approaches Face 3 in a direction substantially perpendicular to Face 3.

The horizontal prisms on Face 3 receive the light from Face 2 and direct the light upwardly above the horizontal in directions toward the ceiling of the room.

The configuration of the vertical ribs on Face 4 is such that the light which approaches in directions at zero or small azimuth angles is diffused in azimuth directions in order to maintain more uniform conditions in the room and to lower the brightness of the faces. In addition, by the combined effect of Faces 3 and 4 receiving light in a substantially normal direction from Faces 1 and 2, the desirable lighting conditions are obtained. The level of the illumination is maintained and does not vary to any great extent with various task locations and with exterior illumination changes. The brightness ratio is reduced and does not vary appreciably with various task locations and with exterior illumination changes. Furthermore, according to my invention, the uniformity of brightness of the fenestration is increased by reducing the size and spacing of the vertical ribs on Faces 1 and 4, as hereinafter described.

Referring to the accompanying drawings:

Fig. 1 is a perspective view of a room including a fenestration embodying my invention;

Fig. 2 is a plan view of the room;

Fig. 3 is a cross-sectional view on a greatly enlarged scale of a vertical rib on Face 1 showing the path of light rays from wide azimuth angles;

Fig. 4 is a cross-sectional view on a greatly enlarged scale of the vertical ribs on Faces 1 and 4 showing the path of light rays from various azimuth angles;

Fig. 5 is a horizontal cross-sectional view on an enlarged scale of the four air-glass interfaces, showing the extent to which a rib on Face 4 receives light rays from a multiplicity of ribs on Face 1;

Fig. 6 is a vertical cross-sectional view of a fenestration structure comprising two sheets of glass and incorporating my invention;

Fig. 7 is a vertical cross-sectional view of a glass block incorporating my invention;

Fig. 8 is a vertical cross-sectional view of the four air-glass interfaces showing the path of light rays as affected by the horizontal prisms on Faces 2 and 3;

Fig. 9 is a cross-sectional view on a greatly enlarged scale of a modified form of the vertical rib on Face 1, showing the path of light rays from wide azimuth angles Fig. 10 is a cross-sectional view of the modified form of rib shown in Fig. 9, used as the vertical rib on Face 4, and showing the path of the light rays;

Fig. 11 is a cross-sectional view on a greatly enlarged scale of another form of the vertical rib on Face 1, showing the path of light rays from wide azimuth angles;

Fig. 12 is a cross-sectional view of the modified form of the vertical rib shown in Fig. 11 when used as a vertical rib on Face 4, and showing the path of the light rays;

Fig. 13 is a cross-sectional view on a greatly enlarged scale of a modified form of the vertical rib on Face 4, showing the path of light rays; and Fig. 14 is a cross-sectional view on a greatly enlarged scale of a further modification of the vertical rib on Face 4, showing the path of the light rays.

The desirable lighting requirements may be illustrated by referring to a typical room. Referring to Figs. 1 and 2, a room is shown including a fenestration 20 on one wall and various task surfaces 21 throughout the room. The fenestration comprises a series of glass blocks 22 above a clear vision strip 23. As set forth previously, in order to provide high quality lighting the level of illumination in the room should be satisfactory. The illumination should not vary appreciably with various task locations in the room, for example from task A to task B. In addition, the illumination should not vary greatly with exterior illumination changes such as light changes from zero azimuth to a wide azimuth angle Z (Fig. 2) or for overcast skies as are encountered at various times during the day or seasons of the year.

Furthermore, the brightness ratio between the fenestration 20 and the various task locations should be low. In addition, the brightness ratio should not vary appreciably with various task locations, for example from C to D; or for exterior illumination changes during the day or the seasons.

The brightness of the fenestration 20 as viewed directly should be tolerable and comfortable to the view of the average observer and should not vary greatly for various task locations or for various portions of the fenestration. For example, the brightness of a point F on the fenestration should be substantially the same whether viewed from task locations A, B, C or D and the brightness at point F on the fenestration should be substantially the same as the brightness at point J on the fenestration.

According to my invention, the aforementioned lighting conditions are attained by controlling the daylight by means of a fenestration comprising four air-glass interfaces. As shown in Figs. 6 and 7, such interfaces are found in two spaced sheets of glass 24, 25 or in a hollow glass block 26. In such structures, the interfaces are conventionally referred to as Faces 1, 2, 3 and 4—Face 1 being the exterior interface, Faces 2 and 3 being the interior interfaces, and Face 4 being the interface nearest the interior of the room. According to my invention as shown in Figs. 6 and 7, Faces 1 and 4 are provided with vertical ribs 27, 28, having particular configurations as hereinafter described, and Faces 2 and 3 are provided with horizontal prisms 29, 30.

According to my invention, the vertical rib on Face 1 receives light from wide azimuth angles and directs it toward Face 2 at zero or small azimuth angles. In order to accomplish this, each rib is so designed that light received at wide azimuth angles is directed by refraction and total internal reflection into the desired direction.

One form of the vertical rib is shown in section in Fig. 3. As here shown, the rib is symmetrical and comprises a series of flat surfaces. Beginning at the apex, surfaces 40, 41 are provided at angle $a_1$ with a vertical plane normal to the faces, and separated by a short arc having a radius $r_1$. The surfaces successively are 42, 43 at smaller angle $a_2$ and separated from surfaces 40, 41 respectively by short arcs having a radius $r_1$; surfaces 44, 45 at angle $a_3$ and smaller than angles $a_1$, $a_2$; and arcuate surfaces 46, 47 having a radius $r_2$ and separated from surfaces 44, 45, respectively, by short arcs having a radius $r_1$. The rib has a height $H_1$ and width $W_1$.

By such a construction, a light ray $L_1$, entering at a small azimuth angle $z_2$ is refracted at the surface 41 and passes therefrom directly through the prism. However, as the azimuth angle increases, for example, by the change of sun position during the day, a light ray $L_2$ at azimuth angle $z_3$ is refracted at surface 41 and totally internally reflected at surface 44, passing to Face 2 in a direction approaching a zero azimuth angle. Similarly, light ray $L_3$ is refracted at surface 41 and totally internally reflected at surface 42; light ray $L_4$ refracted at surface 41 and totally internally reflected at surface 44; and light ray $L_5$ is refracted at surface 43 and totally internally reflected at surface 44.

It is thus apparent that light from wide azimuth angles is directed in a direction approaching a normal to Face 1 as viewed in Fig. 3 by refraction and total internal reflection of the light rays. In this manner the total amount of light transmitted is increased and Faces 2 and 3 receive light more uniformly throughout their faces.

The ratio of the amount of light transmitted at wide azimuth angles relative to the amount of light transmitted at small azimuth angles may be increased by increasing the ratio of height $H_1$ to width $W_1$ of the rib.

In order that there will be refraction and total internal reflection of the light rays, the rib is so designed that for a particular azimuth angle or range of azimuth angles the angle of incidence on the reflecting surface is greater than the critical angle of reflection.

It is apparent that the critical angle of reflection will depend upon the type of light directing material used and may be easily calculated from the index of refraction of the material. For example, if borosilicate glass having an index of refraction of 1.518 were used, the critical angle of reflection would be approximately 41°. It is further apparent that in order that the light rays from wide azimuth angles be redirected toward the normal to the plane of the glass, the surface nearest the base of the vertical ribs, forms an angle with a normal to the plane of the glass that is less than the critical angle of reflection of the glass. The remaining surfaces, toward the apex, form progressively increasing angles with the normal.

As shown in Fig. 8, the horizontal prisms on Faces 2 and 3 are designed, in a manner old in the art, to receive light from above the horizontal and direct it upwardly toward the ceiling of the interior of the room. For example, a light ray L at angle S is first refracted in a horizontal direction and then refracted upwardly to the ceiling.

As shown in Fig. 4, the rib on Face 4 may have the same configuration as that on Face 1. In Fig. 4, the Faces 1 and 4 are shown very closely spaced as they might be in a structure made of two glass sheets. The light rays would have the paths as shown: light ray $L_1$ after being refracted at the rib on Face 1 is refracted at each of the Faces 2, 3, and 4; light ray $L_2$ after being refracted and totally internally reflected by the rib on Face 1 is refracted at Faces 2 and 3 and totally internally reflected at surface 49 and refracted into the room at surface 50; light ray $L_5$ after being refracted and totally internally reflected by the rib on Face 1 is refracted at Faces 2 and 3 and refracted at surface 51. The ribs on Face 4, utilizing the same construction as the ribs on Face 1, serve to diffuse the light, changing the path from small to large azimuth angles and more uniformly scattering the light throughout the room. The ribs on Face 4 also aid in lowering the brightness of the fenestration when viewed directly so that an observer may tolerably view it directly without squinting or eye strain. Moreover, the fenestration thereby has approximately the same brightness when viewed from all angles. The brightness of Face 4 may be varied by changing the angles $a_1$, $a_2$, $a_3$ and radii $r_1$, $r_2$ on the ribs on Face 4.

I have found that the uniformity of the brightness of the fenestration when viewed directly is related to the size of the vertical ribs on Faces 1 and 4. Each of the surfaces of the rib which transmits light to the eye of the observer ordinarily is seen as a vertical line when the fenestration is viewed directly. However if the size of the rib is reduced until the distance between the vertical lines is less than the visual acuity of an average observer, then the uniformity of the brightness will be materially increased and the observer will be able to look directly at the fenestration without squinting or eye strain. Generally, the distance between the vertical lines should be determined by the limits of visual acuity of an average observer, namely, one minute or 0.00029 radians. The maximum distance $x$ between the lines in order that they can not be resolved as viewed at any distance $y$ of the observer can be expressed by the equation $x = 0.00029\ y$.

The manner in which this expression can be utilized in determining the size of the ribs may be shown by reference to Fig. 5. As shown in Fig. 5, the sheets or portions of the hollow glass block are spaced apart at a distance $d$. At the distance $d$, each rib on Face 4 receives light or "sees" a plurality of ribs on Face 1, $m$ inches wide. If $n$ is the number of ribs per inch on Face 1 and we assume a single line or strip of light is transmitted from each rib, then the number of lines seen by each rib on Face 4 is equal to $mn$. If $n'$ is the number of ribs per inch on Face 4, then the number of lines per inch on Face 4 is equal to $mnn'$. However, it is known that each rib on Faces 1 and 4 has several surfaces which produce vertical strips of light. If $p$ is the number of surfaces on Face 1 and $q$ is the number of surfaces on Face 4 then the number of lines per inch on Face 4 will be equal to $mnn'pq$. I have found, however, that as the size of the rib is reduced, the strips of light from Face 1 will be grouped and only the lines on Face 4 can be discerned at any distance. Thus the number of lines per inch on Face 4 is equal to $n'q$. Using this relationship then the distance $x$ between the lines should be equal to the reciprocal of $n'q$. Substituting in the expression for $x$ then:

$$x = \frac{1}{n'q} = 0.00029 y$$

where:
$x$ = distance between the vertical lines
$y$ = distance between fenestration and observer
$n'$ = number of ribs per inch on Face 4
$q$ = number of surfaces on each rib on Face 4

For example, if the ribs were designed for an observer at 10 ft. or more, the distance $x$ between the lines should be less than:

$$x = 0.00029\ y = 0.00029 \cdot 12 \cdot 10 = 0.035 \text{ inch}$$

Utilizing this value with the rib shown in Fig. 3 where $q = 6$ then the number of ribs per inch must be equal to or more than:

$$n' = \frac{1}{0.035q} = \frac{1}{0.035 \cdot 6} = 4.76 \text{ ribs/inch}$$

A modified form of the vertical rib on Face 1 is shown in Fig. 9, the various surfaces being curved instead of being flat. More specifically, the rib is symmetrical and comprises a surface 55 at the apex having a radius $r_3$. The rib then includes successively surfaces 56, 57 at radius $r_4$; surfaces 58, 59 at radius $r_5$; surfaces 60, 61 at radius $r_6$; straight surfaces 62, 63 at angle $a_4$; and surfaces 64, 65 at radius $r_7$. The height of the rib is $H_2$ and the width is $W_2$.

The path of the light rays is similar to that shown in the previous form of the rib, the rays from wide azimuth angles being refracted and then totally internally reflected. As shown for example in Fig. 9 light ray $L_6$ is refracted at surface 55 and totally internally reflected at surface 58; light ray $L_7$ is refracted at surface 57 and totally internally reflected at surface 58; and light ray $L_8$ is refracted at surface 59 and totally internally reflected at surface 60.

As in the other form of the invention, the total amount of light transmitted is thus increased thereby maintaining the lighting conditions throughout the various positions of the sun during the day and the seasons of the year. In addition, the interior faces are more uniformly lighted.

As in the other form of the invention, the ratio of the total amount of light transmitted at wide azimuth angles to the amount of light transmitted at small azimuth angles may be increased by increasing the ratio of the height $H_2$ to the width $W_2$.

As shown in Fig. 10, the form of rib illustrated in Fig. 9 may be used on Face 4. When so used the rib operates by refraction and total internal reflection to diffuse the light thereby providing more uniform light throughout the room and also reducing the brightness of the fenestration when viewed directly. For example light rays, $L_9$ and $L_{10}$, entering in the preferred direction normal to Face 3, are refracted and totally internally reflected and then are refracted into the room at wide azimuth angles. The brightness of Face 4 may be varied by adjusting the radii and angles in a manner similar to the other form of the invention. In addition, the uniformity of the brightness may be controlled by controlling the number of ribs per inch as fully discussed above.

Another form of the vertical rib on Face 1 is shown in Fig. 11. As shown in Fig. 11, the rib is symmetrical and includes a reversed curve surface 66 having a radius $r_8$ at the apex. The rib successively includes flat surfaces 67, 68 at angle $a_5$; curved surfaces 69, 70 at radius $r_8$; curved surfaces 71, 72 at radius $r_9$; curved surfaces 73, 74 at radius $r_8$; and short horizontal surfaces 75, 76. The height of the rib is $H_3$ and the width is $W_3$.

This rib, as in the other forms, operates on light from wide azimuth angles by refraction and total internal reflection to direct this light toward the Faces 2, 3 and 4. This is readily apparent by referring to the paths of the light rays $L_{11}$, $L_{12}$, $L_{13}$, and $L_{14}$, as shown in Fig. 11.

As shown in Fig. 12, the form of rib illustrated in Fig. 11 may be used on Face 4. When so used, the light entering from the preferred normal is refracted and totally internally reflected to produce the desired lighting conditions. This may be shown by reference to the paths of light rays $L_{15}$, $L_{16}$, and $L_{17}$, on Fig. 12.

A modified form of the rib on Face 4 is shown in Fig. 13. This rib may be used to provide a specific light distribution from Face 4, as presently described. The rib is symmetrical and only one half of the rib will be described in order to promote clarity. Referring to Fig. 13, the rib comprises a curved surface 80 having a radius $r_{10}$ at its center. The rib then includes successively surfaces 81 at angle $a_6$; curved surfaces 82 having a radius $r_{11}$; straight surfaces 83 at angle $a_7$; curved surfaces 84 at the apexes of the rib and having a radius $r_{12}$; straight surfaces 85 at angle $a_8$; curved surfaces 86 having a radius $r_{13}$; straight surfaces 87 at angle $a_9$; and curved surfaces 88 having a radius $r_{14}$. The height of the rib is $H_4$ and the width is $W_4$.

As pointed out above, this rib construction can be utilized to provide a specific light distribution from Face 4. This may most easily be understood by analyzing the directions in which each of the surfaces directs light. Referring to Fig. 13, the surfaces 80, 82, 84, and 86 direct light into the very small azimuth angles as shown by light rays $L_{30}$, $L_{28}$, $L_{25}$, and $L_{22}$. The surfaces 81 and 87 direct light into the small azimuth angles as shown by light rays $L_{29}$ and $L_{21}$. The surfaces 83, 85 direct light to the intermediate azimuth angles and the portions of surface 84 which merge with surfaces 83 and 85 direct light to the wide azimuth angles, as shown by light rays $L_{24}$, $L_{26}$. It should be noted here that the distribution to the wide azimuth angles is obtained by refraction and total internal reflection as in the other forms of the invention.

It is apparent that by varying the angles and radii of the respective surfaces the distribution of light in the azimuth direction may be accurately controlled as desired. This may be shown by reference to Fig. 14, wherein the center of the rib has been modified and, as shown, surface 90 forms the center of the rib. By this change the light to the small azimuth angles is increased as shown by light rays $L_{31}$, $L_{32}$, $L_{33}$ and $L_{34}$.

The control of the size and spacing of the vertical ribs on Faces 1 and 4, in the manner set forth previously to increase the uniformity of the brightness of Face 4, is equally applicable to each of the modifications herein set forth.

The control of light according to my invention to provide the desired lighting conditions may be summarized as follows:

By utilizing four air-glass interfaces, comprising vertical ribs of a particular configuration on Faces 1 and 4, and horizontal prisms on Faces 2 and 3, I have provided a fenestration for controlling daylight to produce the following lighting conditions: First, a satisfactory level of illumination which does not vary appreciably with various task locations or with exterior illumination changes; Second, low brightness ratios between the fenestration and the task which do not vary appreciably with different task locations or with exterior illumination changes; Third, brightness of the fenestration which is sufficiently low and uniform that it may be viewed directly by the average observer without squinting or eye strain.

Modifications may be resorted to within the spirit and scope of the appended claims.

I claim:

1. A fenestration structure for utilizing daylight to light an interior, said structure comprising a sheet of glass intended to be interposed in a vertical position, one surface of said sheet having a series of symmetrical parallel ribs formed thereon and extending longitudinally thereof, said ribs extending vertically when the sheet is positioned in vertical position, the ribs having their apices in substantially the same plane, each said rib comprising a multiplicity of surface portions extending from the base to the apex thereof, the surface portion on each side of said rib and nearest the base of the rib forming an angle with a normal to the plane of the sheet of glass that is less than the critical angle of reflection of the glass, the remaining surface portions on each side of said rib, adjacent the surface portion nearest the base and extending progressively toward the apex, forming successively greater angles with a normal to the plane of the glass, whereby when the sheet is positioned vertically in an opening, light rays, such as sunlight from wide azimuth angles, striking the rib and lying in longitudinal planes at small acute angles to the plane of the glass are refracted by the surface portions nearest the apex on one side of said rib to the surface portions nearest the base on the other side of said rib and internally reflected by the latter surface portions to the other surface of the glass sheet in directions substantially normal to the plane of the glass.

2. The structure defined in claim 1, the distance between the apices of adjacent ribs being about equal to the width of a rib at its base.

3. The structure defined in claim 2, the depth of each rib being not less than the width of the rib at its base.

4. A fenestration structure for utilizing daylight to light an interior, said structure comprising a sheet of glass intended to be interposed in a vertical position, one surface of said sheet having a series of symmetrical parallel ribs formed thereon and extending longitudinally thereof, said ribs extending vertically when the sheet is positioned in vertical position, the ribs having their apices in substantially the same plane, each said rib comprising a multiplicity of surface portions extending from the base to the apex thereof, the surface portion on each side of said rib and nearest the base of the rib forming an angle with a normal to the plane of the sheet of glass that is less than the critical angle of reflection of the glass, the remaining surface portions on each side of said rib, adjacent the surface portion nearest the base and extending progressively toward the apex, forming successively greater angles with a normal to the plane of the glass, whereby when the sheet is positioned vertically in an opening, light rays, such as sunlight from wide azimuth angles, striking the rib and lying in longitudinal planes at small acute angles to the plane of the glass are refracted by the surface portions nearest the apex on one side of said rib to the surface portions nearest the base on the other side of said rib and internally reflected by the latter surface portions to the other surface of the glass sheet in directions substantially normal to the plane of the glass, a second sheet of glass parallel with and spaced from the first mentioned sheet, said second sheet having the surface thereof furthest from the first sheet formed with a series of symmetrical parallel ribs having a configuration substantially similar to the ribs on the first mentioned sheet, said ribs extending in substantially the same directions as the ribs on the first mentioned sheet, whereby light rays passing through the second sheet striking the surfaces nearest the base of the ribs, and lying in planes normal to the plane of the second sheet are totally reflected and refracted at wide angles to the normal to the plane of the sheet.

5. A hollow block for utilizing daylight to light an interior, said block being made of light transmitting material and comprising parallel spaced light-transmitting walls, said block being intended to be positioned in an opening with the light transmitting walls in a vertical position, one surface of said wall having a series of symmetrical parallel ribs formed thereon and extending longitudinally thereof, said ribs extending vertically when the block is in position in an opening, the ribs having their apices in substantially the same plane, each said rib comprising a multiplicity of surface portions extending from the base to the apex thereof, the surface portion on each side of said rib and nearest the base of the rib forming an angle with a normal to the plane of the wall of light transmitting material that is less than the critical angle of reflection of the light transmitting material, the remaining surface portions on each side of said rib adjacent the surface portion nearest the base and extending progressively toward the apex forming successively greater angles with a normal to the plane of the light transmitting material, whereby when the block is in position, light rays, such as sunlight from wide azimuth angles, striking the ribs and lying in longitudinal planes at small acute angles to the plane of the light transmitting material are refracted by the surface portions nearest the apex on one side of said rib to the surface portions nearest the base on the other side of said rib and internally reflected by the latter surface portions to the other surface of the light transmitting material wall in directions substantially normal to the plane of the light transmitting material.

6. The block set forth in claim 5, the distance between the apices of adjacent ribs being about equal to the width of a rib at its base.

7. The block set forth in claim 6, the depth of each rib being at least as great as the width of the rib at its base.

8. A hollow block for utilizing daylight to light an interior, said block being made of light-transmitting material and comprising parallel spaced light-transmitting walls, said block being intended to be positioned in an opening with the light transmitting walls in a vertical position, one surface of said wall having a series of symmetrical parallel ribs formed thereon and extending longitudinally thereof, said ribs extending vertically when the block is in position in an opening, the ribs having their apices in substantially the same plane, each said rib comprising a multiplicity of surface portions extending from the base to the apex thereof, the surface portion on each side of said rib and nearest the base of the rib forming an angle with a normal to the plane of the wall of light transmitting material that is less than the critical angle of reflection of the light transmitting material, the remaining surface portions on each side of said rib adjacent the surface nearest the base and extending progressively toward the apex forming successively greater angles with a normal to the plane of the light transmitting material, whereby when the block is in position, light rays, such as sunlight from wide azimuth angles, striking the ribs and lying in longitudinal planes at small acute angles to the plane of the light transmitting material are refracted by the surface portions nearest the apex on one side of said rib to the surface portions nearest the base on the other side of said rib and internally reflected by the latter surface portions to the other surface of the light transmitting material wall in directions substantially normal to the plane of the light transmitting material, said second wall having the outer surface thereof formed with a series of symmetrical ribs having a configuration substantially similar to the ribs on the first wall, said ribs extending substantially in the same direction as the ribs on the first wall, whereby light rays passing from the first wall, striking the surfaces nearest the base of the ribs, and lying in planes normal to the plane of the second wall are totally reflected and refracted at wide angles to the normal to the plane of the wall.

9. The block set forth in claim 8, the exterior surfaces of said walls being spaced apart a distance many times greater than the depth of the individual ribs and the distance between adjacent ribs.

10. The combination for utilizing daylight to light an interior which comprises a wall having an opening therein, a sheet of light transmitting material positioned vertically in the opening adjacent the daylight, the surface of said sheet adjacent the daylight having a series of symmetrical parallel ribs formed thereon and extending vertically thereof, the ribs having their apices in substantially the same plane, each said rib comprising a multiplicity of surface portions extending from the base to the apex thereof, the surface portion on each side of said rib and nearest the base of the rib forming an angle with a normal to the plane of the sheet of light transmitting material that is less than the critical angle of reflection of the light transmitting material, the remaining surface portions on each side of said rib, adjacent the surface portion nearest the base and extending progressively toward the apex, forming successively greater angles with a normal to the plane of the light transmitting material whereby light rays striking the rib at wide azimuth angles to the plane of the light transmitting material are refracted by the surface portions nearest the apex on one side of said rib to the surface portions nearest the base on the other side of said rib and internally reflected by the latter surface portions to the second surface of the sheet in directions substantially normal to the plane of the sheet and lying in vertical planes, said second surface of the sheet comprising a series of horizontal prisms, each said prism having a configuration such that light rays are directed in substantially horizontal directions toward the next successive sheet, a second sheet positioned vertically adjacent the interior, the surface of said second sheet nearest the first sheet having a series of horizontal prisms thereon, each said prism having a configuration such that light rays directed against said prisms in a horizontal direction are redirected upwardly toward the interior being lighted, the surface of said second sheet adjacent the interior being formed with a series of symmetrical parallel ribs having a configuration substantially similar to the ribs on the first mentioned sheet, said ribs extending vertically as the ribs in the first mentioned sheet whereby light rays passing through the second sheet and striking the surfaces nearest the base of the ribs and lying in vertical planes normal to the plane of the second sheet are totally reflected and refracted at wide angles to the normal to the plane of the sheet.

11. The combination for utilizing daylight to light an interior which comprises a wall having an opening therein, a hollow block of light transmitting material having two parallel spaced walls positioned vertically in the opening, the surface of said sheet adjacent the daylight having a series of symmetrical parallel ribs formed thereon and extending vertically thereof, the ribs having their apices in substantially the same plane, each said rib comprising a multiplicity of surface portions extending from the base to the apex thereof, the surface portion on each side of said rib and nearest the base of the rib forming an angle with a normal to the plane of the sheet of light transmitting material that is less than the critical angle of reflection of the light transmitting material, the remaining surface portions on each side of said rib, adjacent the surface portion nearest the base and extending progressively toward the apex, forming successively greater angles with a normal to the plane of the light transmitting material whereby light rays striking the rib at wide azimuth angles to the plane of the light transmitting material are refracted by the surface portions nearest the apex on one side of said rib to the surface portions nearest the base on the other side of said rib and internally reflected by the latter surface portions to the second surface of the sheet in directions substantially normal to the plane of the sheet and lying in vertical planes, said second surface of the sheet comprising a series of horizontal prisms, each said prism having a configuration such that light rays are directed in substantially horizontal directions toward the next successive sheet, a second sheet positioned vertically adjacent the interior, the surface of said second sheet nearest the first sheet having a series of horizontal prisms thereon, each said prism having a configuration such that light rays directed against said prisms in a horizontal direction are redirected upwardly toward the interior being lighted, the surface of said second sheet adjacent the interior being formed with a series of symmetrical parallel ribs having a configuration substantially similar to the ribs on the first mentioned sheet, said ribs extending vertically as the ribs in the first mentioned sheet, whereby light rays passing through the second sheet and striking the surfaces nearest the base of the ribs and lying in vertical planes normal to the plane of the second sheet are totally reflected and refracted at wide angles to the normal to the plane of the sheet.

References Cited in the file of this patent

UNITED STATES PATENTS

| | | |
|---|---|---|
| 593,045 | Cummings | Nov. 2, 1897 |
| 637,145 | Moffat et al. | Nov. 14, 1899 |
| 982,772 | Wadsworth | Jan. 24, 1911 |
| 1,610,423 | Cawley | Dec. 14, 1926 |

(Other references on following page)

UNITED STATES PATENTS

| | | |
|---|---|---|
| 1,798,088 | Jansen | Mar. 24, 1931 |
| 1,922,932 | Delano | Aug. 15, 1933 |
| 1,949,898 | Cochrane et al. | Mar. 6, 1934 |
| 1,991,469 | Slayter | Feb. 19, 1935 |
| 2,102,149 | Guthrie | Dec. 14, 1937 |
| 2,179,863 | Rolph | Nov. 14, 1939 |
| 2,269,123 | Mulford | Jan. 6, 1942 |

FOREIGN PATENTS

| | | |
|---|---|---|
| 16,549 | Great Britain | of 1897 |
| 24,699 | Great Britain | of 1902 |